Sept. 15, 1970  S. G. LECOCQ  3,528,290
DEPTH METER ATTACHMENT FOR UNDERWATER PRESSURE GAUGES
Filed Aug. 15, 1969

Samuel G. Lecocq,
INVENTOR.

BY Robert C. Comstock
Attorney 3,528,290
DEPTH METER ATTACHMENT FOR UNDERWATER PRESSURE GAUGES
Samuel G. Lecocq, Huntington Park, Calif., assignor to Pittman Products, Inc., Huntington Park, Calif., a corporation of California
Filed Aug. 15, 1969, Ser. No. 850,475
Int. Cl. G01f 23/14
U.S. Cl. 73—291      6 Claims

ABSTRACT OF THE DISCLOSURE

A depth meter attachment for mounting on an underwater diving pressure gauge to provide a combined depth meter and pressure gauge. The attachment comprises an adaptor bezel which fits on the body member of the pressure gauge. The adaptor bezel carries on its periphery a ring and moving fluid type depth gauge. A depth gauge dial plate is mounted between the adaptor bezel and the glass cover of the pressure gauge. The depth gauge dial plate has a central opening through which the pressure gauge dial plate and indicator are visible, so that both dial plates are simultaneously visible and arranged concentrically.

BACKGROUND OF THE INVENTION

Field of the invention

This invention relates to a depth meter attachment for underwater diving pressure gauges and to a combined depth meter and underwater pressure gauge.

Description of the prior art

The prior art comprises conventional underwater pressure gauges and depth meters, each of which is separate from the other, requiring the diver to wear and check two separate gauges.

SUMMARY OF THE INVENTION

The present invention relates to a depth meter attachment for an underwater pressure gauge which converts it into a combined pressure gauge and depth meter.

With this invention, one instrument can be worn by the diver to provide with a single reading both pressure gauge and depth meter information. This results in economy of cost, increased simplicity and greater convenience for the diver and reduces the amount of equipment required.

The invention comprises an attachment which is capable of being quickly and easily mounted on a pressure gauge without requiring any specialized tools or equipment.

It is accordingly among the objects of the invention to provide a depth meter attachment for underwater pressure gauges which is simple and economical to manufacture and which is more convenient and utilitarian in use.

Another object of the invention is to provide such an attachment whereby two pieces of diving equipment can be replaced with only one.

The invention also comprises such other objects, advantages and capabilities as will later more fully appear and which are inherently possessed by the invention.

While there is shown in the drawing a preferred embodiment of the invention, it should be understood that the same is susceptible of modification and change without departing from the spirit of the invention.

DESCRIPTION OF THE PREFERRED EMBODIMENT

Figure 1:
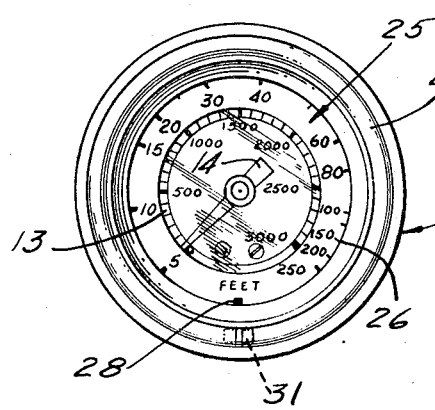
FIG. 1 is a front elevational view of my depth meter attachment in use on an underwater pressure gauge.
Figure 2:
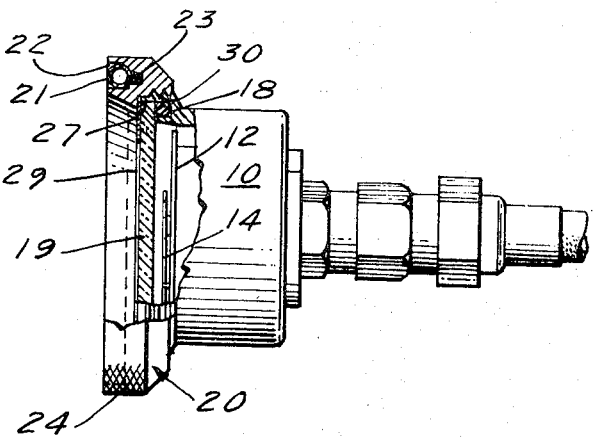
FIG. 2 is a side elevational view of the same partly broken away to show the interior structure in section.
Figure 3:
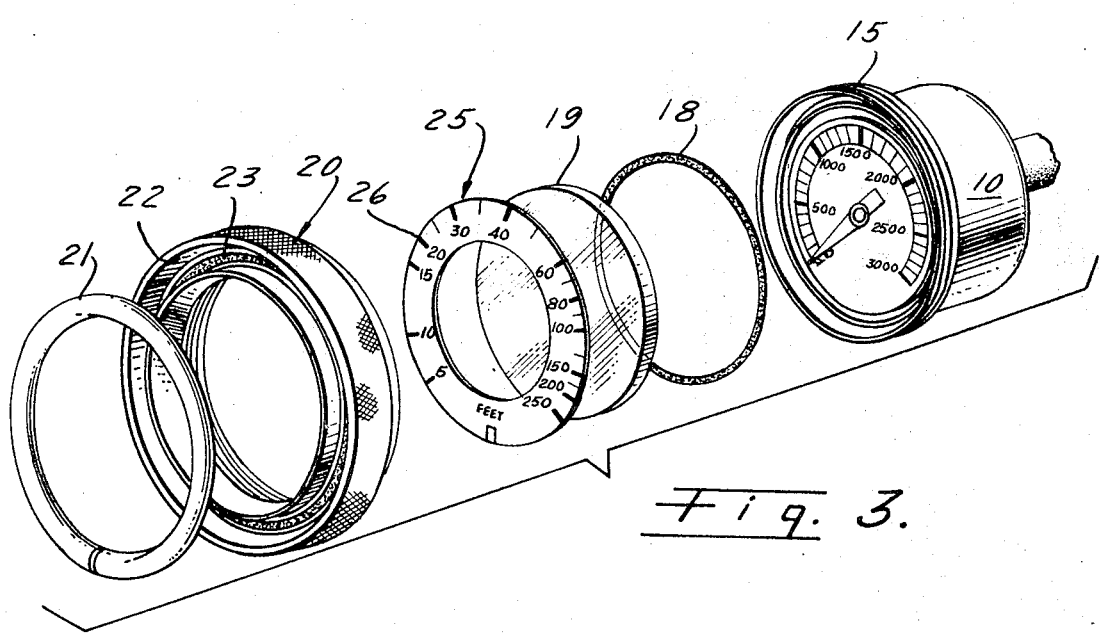
FIG. 3 is an exploded perspective view of the same.

A preferred embodiment which has been selected to illustrate the invention is adapted to be used with a conventional underwater pressure gauge which comprises a body member 10 which encloses a conventional pressure gauge mechanism (not shown) which is connected fittings and a hose to an underwater air or gas supply tank (not shown).

Extending across the front of the body member 10 is a pressure gauge dial plate 12, which carries a scale 13. A rotatable indicator 14 is operated by the pressure gauge mechanism to provide a pressure reading on the scale 13 of the dial plate 12.

Mounted across the face of the body member 10 spaced outwardly from the dial plate 12 is a piece of transparent glass 19. The glass 19 is cushioned by an O-ring 18. The outer periphery of the outer portion of the body member 10 is provided with external screw threading 15. An internally screw threaded bezel which is not shown in the drawings fits on the screw threading 15 to complete the conventional pressure gauge device.

My attachment comprises an adaptor bezel 20, which has internal screw threading 30 which is adapted to engage the threading 15 of the body member 10, so that the adaptor bezel 20 may be used in place of the conventional pressure gauge bezel.

Extending around the periphery of the adaptor bezel 20 is a depth gauge ring 21, which is mounted within a recess 22 so that the outer edge of the ring 21 is substantially flush with the outer edge of the adjacent portion of the bezel 20. Mounted at the base of the recess 22 is a contrast ring 23, which cooperates with the depth gauge ring 21 in providing a depth gauge reading. The exterior of the bezel 20 carries knurling 24 to facilitate its attachment to the body member 10 of the pressure gauge.

A depth dial plate 25 having a depth scale 26 extending around its periphery is mounted in a position in which it overlies the outer surface of the glass 19 and underlies an annular inwardly directed shoulder 27 of the bezel 20. When the bezel 20 is mounted on the body member 10, the shoulder 27 engages and holds the depth dial plate 25 in fixed position against the glass 19, with its zero indicator 28 pointed downwardly and aligned with a plug 31 which connects the ends of the depth gauge ring 21.

The depth dial plate 25 is provided with a central circular opening 29, through which the scale 13 of the dial plate 12 and the indicator 14 of the pressure gauge are visible.

The depth gauge ring 21 is conventional in its structure and operation. It is preferably formed of Tygon plastic and is normally somewhat opaque. In use, water enters the ring 21 through a slit in the plug 31 and moves around the ring 21 in response to the water pressure. The water makes the ring transparent and magnifies the contrast ring 23 behind it to provide a visible solid yellow line extending clockwise from the plug 31 to the end of the water in the ring 21.

The attachment of the present invention is adapted to be used in combination with a conventional pressure gauge by removing the pressure gauge bezel and replacing it with the adaptor bezel 20. The result, as shown in FIG. 1 of the drawings, is a combination gauge in which the pressure is readable by the position of the indicator with respect to the scale 13 of the dial plate 12, while the depth is readable by the position of the fluid in the ring 21 with respect to the depth scale 26 of the depth dial plate 25. The depth dial plate 25 is customarily calibrated in feet for use in this country, but is capable of being calibrated in meters for metric system users or in other systems of measurement. The pressure gauge dial plate 12 is customarily calibrated in pounds, but could be calibrated for other systems of measurement.

The present invention simplifies and reduces the amount of equipment which the diver must carry because the pressure gauge and depth gauge are both incorporated in a single instrument. The depth dial plate 25 concentrically surrounds the scale carrying portion of the pressure gauge dial plate 12, but does not interfere with its operation or reading.

I claim:

1. For use in combination with a pressure gauge of the type having a body member with a circular pressure gauge dial plate and a dial indicator associated therewith which is rotatable to indicate pressure readings on said pressure gauge dial plate, a depth gauge attachment adapted to be mounted on the body member of said pressure gauge, said attachment including an annular depth gauge ring having a fluid adapted to be moved within and around said ring in responsce to the ambient pressure to which said ring is subjected, said attachement including a circular depth gauge dial plate adapted to be mounted in overlying relationship to said pressure gauge dial plate, so that both of said dial plates are simultaneously visible to the user, said attachment converting said pressure gauge into a combined pressure and depth gauge.

2. The structure described in claim 1, said depth gauge dial plate being mounted in concentric relationship to said pressure gauge dial plate, said depth gauge dial plate having a central opening through which said pressure gauge dial plate is visible.

3. The structure described in claim 2, said body member carrying external screw threading, said attachment comprising a bezel carrying said depth gauge ring and having internal screw threading engageable with the threading on said body member to mount said attachment on said body member.

4. The structure described in claim 3, said bezel having an inwardly directed annular shoulder, said shoulder engaging the outer periphery of said depth gauge dial plate to hold said dial plate in fixed position on the body member of said pressure gauge.

5. The structure described in claim 4, said pressure gauge including a glass overlying said pressure gauge dial plate, said adaptor gauge dial plate being disposed and held between the outer face of said glass and said shoulder of said bezel.

6. The structure described in claim 5, said ring being mounted in an annular recess extending around the outer front face of said bezel, the outer edge of said ring being substantially flush with the outer edge of the front of said bezel.

References Cited
UNITED STATES PATENTS

| | | | |
|---|---|---|---|
| 2,394,987 | 2/1946 | Deming | 73—389 |
| 2,935,873 | 5/1960 | Stewart | 73—300 |
| 2,986,038 | 5/1961 | Cerny | 73—300 XR |
| 3,188,864 | 6/1965 | Dean | 73—300 |
| 3,203,244 | 8/1965 | Alihari | 73—300 |
| 3,375,718 | 4/1968 | Robinson et al. | 73—406 |
| 3,377,860 | 4/1968 | Masters | 73—291 |

LOUIS J. CAPOZI, Primary Examiner

U.S. Cl. X.R.

73—300, 389; 116—70, 129